(12) United States Patent
Shin et al.

(10) Patent No.: US 11,769,047 B2
(45) Date of Patent: Sep. 26, 2023

(54) ARTIFICIAL INTELLIGENCE APPARATUS USING A PLURALITY OF OUTPUT LAYERS AND METHOD FOR SAME

(71) Applicant: LG ELECTRONICS INC., Seoul (KR)

(72) Inventors: Dongyeon Shin, Seoul (KR); Sungmin Park, Seoul (KR); Jemin Woo, Seoul (KR); Kiyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 644 days.

(21) Appl. No.: 16/924,951

(22) Filed: Jul. 9, 2020

(65) Prior Publication Data

US 2021/0319311 A1    Oct. 14, 2021

(30) Foreign Application Priority Data

Apr. 8, 2020    (KR) .................. 10-2020-0042501

(51) Int. Cl.
*G06N 3/10* (2006.01)
*G06N 20/10* (2019.01)
(Continued)

(52) U.S. Cl.
CPC .............. *G06N 3/08* (2013.01); *A47L 9/2805* (2013.01); *G06F 18/241* (2023.01);
(Continued)

(58) Field of Classification Search
CPC .......... G06N 3/08; G06N 20/00; H05B 47/11; G06F 18/251; G06F 18/241; A47L 9/2805

See application file for complete search history.

(56) References Cited

U.S. PATENT DOCUMENTS 10,327,697 B1 *    6/2019    Stein ...................... G16H 50/20
10,438,264 B1 *    10/2019    Viswanathan ........... G06N 5/04
(Continued)

FOREIGN PATENT DOCUMENTS

| CN | 110929575 | 3/2020 |
| JP | 2018031812 | 3/2018 |
| KR | 20190094317 | 8/2019 |

OTHER PUBLICATIONS

Ditzler, Gregory, et al., "Learning in Nonstationary Environments: A Survey", IEEE Computational Intelligence Magazine, IEEE, US, vol. 10, No. 4, XP011586653, Nov. 2015, pp. 12-25.
(Continued)

*Primary Examiner* — Brandon S Cole
(74) *Attorney, Agent, or Firm* — LEE, HONG, DEGERMAN, KANG & WAIMEY PC

(57) ABSTRACT

The present disclosure discloses an artificial intelligence apparatus including an input interface configured to obtain input data, a sensing interface configured to obtain environment information, and one or more processors configured to classify an object by inputting the input data obtained from the input interface to an artificial intelligence model, in which the artificial intelligence model uses a first learning model and a second learning model which is connected with the first learning model and includes a plurality of output layers to respectively assign weights to the respective result values output by the plurality of output layers and combine the respective result values to which the weights are assigned to derive the final result.

10 Claims, 11 Drawing Sheets

(51) Int. Cl.
  *G06N 3/08*      (2023.01)
  *G06N 20/00*     (2019.01)
  *H05B 47/11*     (2020.01)
  *A47L 9/28*      (2006.01)
  *G06F 18/241*    (2023.01)
  *G06F 18/25*     (2023.01)

(52) U.S. Cl.
  CPC ........... *G06F 18/251* (2023.01); *G06N 20/00*
    (2019.01); *H05B 47/11* (2020.01)

(56) References Cited

U.S. PATENT DOCUMENTS

| | | | |
|---|---|---|---|
| 2015/0127594 A1* | 5/2015 | Parada San Martin | ...................... G10L 15/16 706/16 |
| 2016/0378117 A1* | 12/2016 | Szatmary | ............. G06V 10/145 382/153 |
| 2019/0005399 A1* | 1/2019 | Noguchi | ................ G06N 3/044 |
| 2019/0050692 A1 | 2/2019 | Sharma et al. | |
| 2019/0279094 A1* | 9/2019 | Baughman | ............... G06N 3/10 |
| 2020/0134455 A1* | 4/2020 | Choi | ...................... G06N 3/088 |
| 2020/0160117 A1* | 5/2020 | Urtasun | ................ G06V 10/82 |

OTHER PUBLICATIONS

Guan, et al., "Fusion of Multispectral Data Through Illumination-aware Deep Neural Networks for Pedestrian Detection", ARXIV. org, Cornell University Library, 201 OLIN Library Cornell University Ithaca, NY, 14853, Feb. 2018, 12 pages.

European Patent Office Application Serial No. 20197883.0, Extended European Search Report dated Mar. 22, 2021, 3 pages.

Ong, et al., "Dynamically pre-trained deep recurrent neural networks using environmental monitoring data for predicting PM2.5", In: Neural Computing and Applications 2016, vol. 27, pp. 1553-1566, Jun. 2015.

Yakoubi, et al., "The path planning of cleaner robot for coverage region using Genetic Algorithms", In: Journal of Innovation in Digital Ecosystems, vol. 3, No. 1, pp. 37-43, Jun. 2016.

PCT International Application No. PCT/KR2020/008179, Written Opinion of the International Searching Authority dated Dec. 2020, 11 pages.

* cited by examiner

FIG. 7

| TIME | Default (α) – FIRST WEIGHT | Day (β) – SECOND WEIGHT | Night (γ) – THIRD WEIGHT |
|---|---|---|---|
| 06 ~ 08 | 0.1 | 0.2 | 0.7 |
| 08 ~ 10 | 0.1 | 0.4 | 0.5 |
| 10 ~ 12 | 0.1 | 0.7 | 0.2 |
| 12 ~ 16 | 0.1 | 0.9 | 0.0 |
| 16 ~ 18 | 0.1 | 0.6 | 0.3 |
| 18 ~ 20 | 0.1 | 0.7 | 0.2 |
| 20 ~ 06 | 0.1 | 0.0 | 0.9 |

ARTIFICIAL INTELLIGENCE APPARATUS USING A PLURALITY OF OUTPUT LAYERS AND METHOD FOR SAME

CROSS-REFERENCE TO RELATED APPLICATIONS

Pursuant to 35 U.S.C. § 119(a), this application claims the benefit of earlier filing date and right of priority to Korean Patent Application No. 10-2020-0042501, filed on Apr. 8, 2020, the contents of which are all hereby incorporated by reference herein in its entirety.

BACKGROUND

The present disclosure relates to an artificial intelligence apparatus having output layers and a method for the same.

Deep learning is a method for learning an artificial neural network of several classification layers with given data. If the data with the correct answer is input to the artificial neural network, the weight of each classification layer is learned through the data, and based on the weight, the answer of the new data is inferred. As such, the weight of each classification layer is adjusted through the data, but it takes a lot of time to learn the weight of all the classification layers.

The concept of transfer learning was introduced to compensate for the above disadvantages. The transfer learning means that if the amount of new data to be learned is small and similar to the original data, only the weight of the last classification layer is learned again without modifying the weights of the other classification layers except for the last classification layer to reduce the time cost.

Meanwhile, with the introduction of transfer learning, new data could be learned with less computational quantity than the quantity learning the entire classification layers, but since the last classification layer was learned with a small amount of new data, there was a problem that the result value is overfitted due to being focused on the relevant data.

SUMMARY

An object of the present disclosure is to provide a highly accurate classification model in an individual environment using a small amount of learning data and to prevent overfitting by transfer learning.

In addition, an object of the present disclosure is to increase the accuracy of the artificial intelligence model by learning by reflecting the illuminance over time.

In addition, an object of the present disclosure is to provide an artificial intelligence model for escaping from the restraint situation by resetting the route if the robot cleaner fails to escape from the restraint situation.

The present disclosure includes one or more processors configured to classify an object by obtaining input data to be input to an artificial intelligence model by an input interface, obtaining environmental information obtained by a sensing interface, and inputting the input data obtained at the input interface to the artificial intelligence model, in which the artificial intelligence model includes a first learning model and a second learning model connected to the first learning model, the first learning model includes a pre-training model, and the second learning model includes a plurality of output layers learned by transfer learning.

The one or more processors may be configured to connect the first learning model with the plurality of output layers, assign weights corresponding to the result values output by the plurality of output layers, and combine the respective result values to which weights are assigned to derive a final result.

In addition, the one or more processors may be configured to control the operation of the artificial intelligence apparatus according to the final result.

The weights assigned to the respective result values output by the plurality of output layers may be determined based on brightness information obtained by the sensing interface. In addition, the weights may be determined corresponding to time information obtained by the sensing interface.

In addition, if the respective result values output by the plurality of output layers are different from each other, the one or more processors may be configured to generate a new output layer and train a new output layer using input data and a final result.

In addition, if the result values output by the plurality of output layers are unknown, which is incapable of specifying an object, the one or more processors may be configured to receive correct answer information through an input interface from a user and train each of the plurality of output layers using the correct answer information.

In addition, if the artificial intelligence apparatus of the present disclosure is mounted on a robot cleaner, the one or more processors may be configured to generate surrounding situation map data using 3D sensor data and bumper sensor data obtained from the sensing interface, and if restraint risk is determined from the surrounding situation map data, the one or more processors may set an escape route by assigning weights to the respective result values output by the plurality of output layers and control the operation of the robot cleaner.

In addition, if the restraint continues for a preset time or longer, the one or more processors may be configured to reset the weight assigned to the respective result values output from the plurality of layers, and derive the reset route information by combining the respective result values to which reset weights are assigned to control the robot cleaner.

BRIEF DESCRIPTION OF THE DRAWINGS

FIG. 7 is a view illustrating an example of a weight according to an embodiment of the present disclosure.

DETAILED DESCRIPTION OF THE EMBODIMENTS

Figure 1:
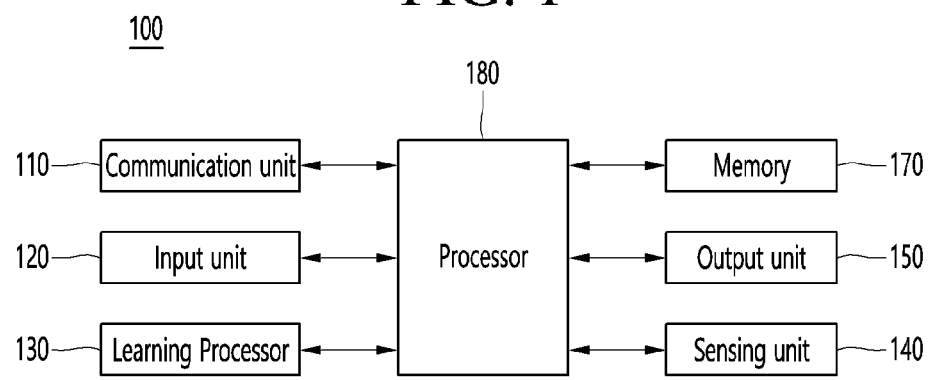
FIG. 1 is a block diagram illustrating an AI apparatus according to an embodiment of the present disclosure.

Hereinafter, details of the present invention will be described.

An embodiment described below is only an example of the present invention, and the present invention can be deformed in various modes. Hence, specific configurations and functions disclosed below by no means limit the claims.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100*a* to 100*e* and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
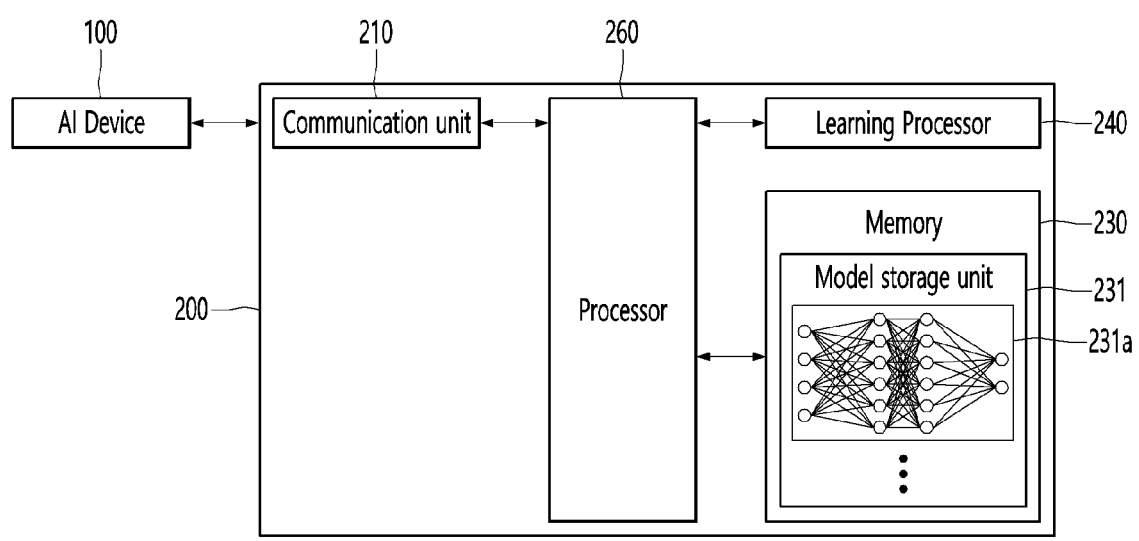
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
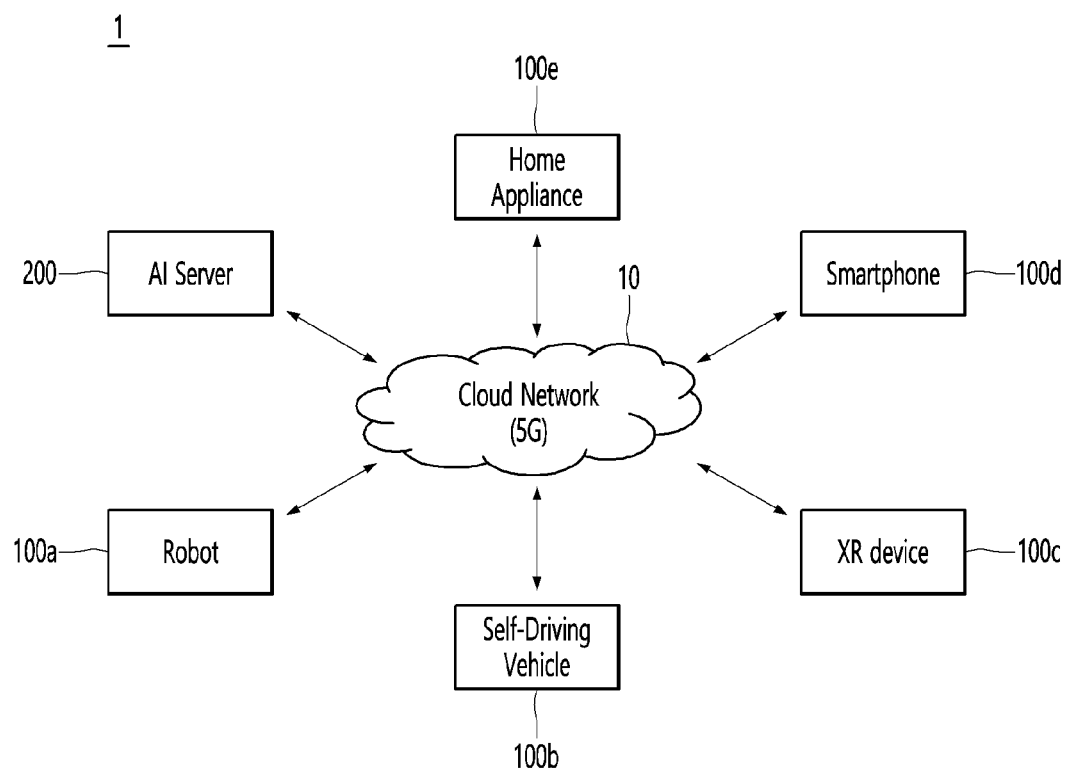
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI apparatuses 100*a* to 100*e*.

Here, the AI server 200 may learn the artificial neural network according to the machine learning algorithm instead of the AI apparatuses 100*a* to 100*e*, and may directly store the learning model or transmit the learning model to the AI apparatuses 100*a* to 100*e*.

Here, the AI server 200 may receive input data from the AI apparatuses 100*a* to 100*e*, may infer the result value for the received input data by using the learning model, may generate a response or a control command based on the inferred result value, and may transmit the response or the control command to the AI apparatuses 100*a* to 100*e*.

Alternatively, the AI apparatuses 100*a* to 100*e* may infer the result value for the input data by directly using the learning model, and may generate the response or the control command based on the inference result.

Hereinafter, various embodiments of the AI apparatuses 100*a* to 100*e* to which the above-described technology is applied will be described. The AI apparatuses 100*a* to 100*e* illustrated in FIG. 3 may be regarded as a specific embodiment of the AI apparatus 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

Here, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the driving interface such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving interface based on the control/interaction of the user. Here, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving interface such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving interface based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
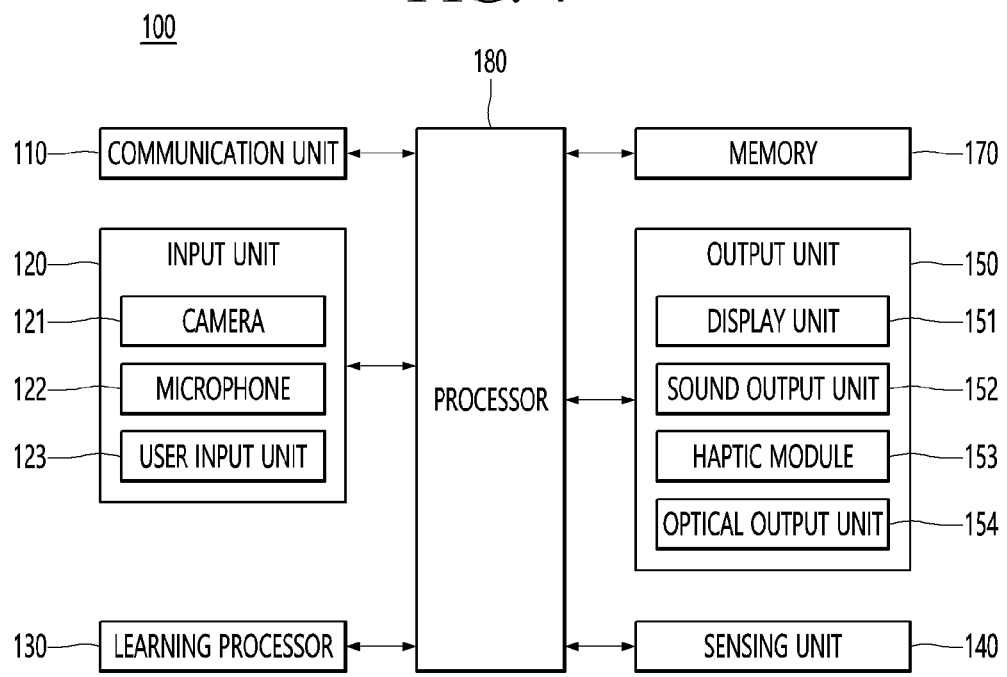
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
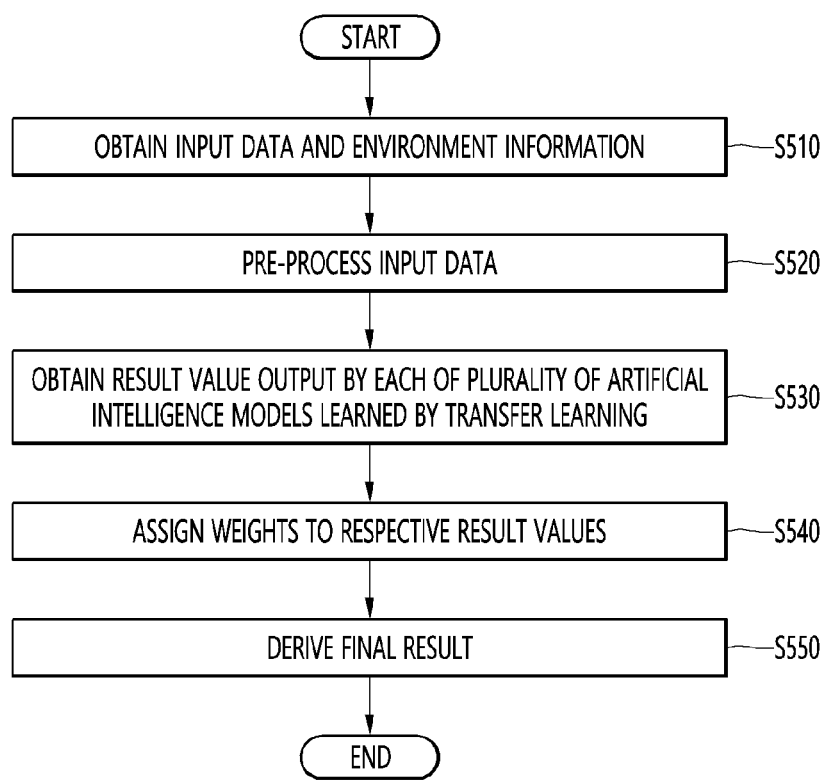
FIG. 5 is a flow chart according to an embodiment of the present disclosure.

FIG. 5 is a flow chart according to an embodiment of the present disclosure.

FIG. 5 is a flow chart illustrating the usage process of the artificial intelligence apparatus 100. First, the artificial intelligence apparatus 100 according to an embodiment of the present disclosure may include an input interface 120 for obtaining input data to be input to an artificial intelligence model, a sensing interface 140 for obtaining environmental information including various sensor information, and one or more processors 180 for classifying an object by inputting input data obtained from the input interface 120 to an artificial intelligence model.

According to an embodiment of the present disclosure, the input interface 120 of the artificial intelligence apparatus 100 may obtain input data to be input to the artificial intelligence model (S510). At this time, the input interface 120 may include a microphone or a camera, the microphone may receive sound data, and the camera may receive image data. In other words, the input data may include sound data or image data.

In addition, the sensing interface 140 of the artificial intelligence apparatus 100 may obtain environmental information including various sensor information. At this time, the environment information obtained from the sensing interface 140 may include brightness information obtained from an illuminance sensor, time information obtained from a GPS sensor, and location information.

The sound data or image data may be pre-processed to be input to the artificial intelligence model (S520). Specifically, the sound data may be pre-processed for spectrogram type image data or frequency feature data of the received sound, and pre-processing such as noise removal for feature extraction of the received image can be performed to the image data.

According to an embodiment of the present disclosure, the processor 180 may classify an object by inputting the input data obtained from the input interface 120 to the artificial intelligence model (S530). Specifically, the processor 180 may assign a weight to a result value output from each of the plurality of artificial intelligence models learned by transfer learning (S540), and finally classify objects by combining the respective result values to which weights are assigned (S550). Hereinafter, the artificial intelligence model will be described in detail.

Figure 6:
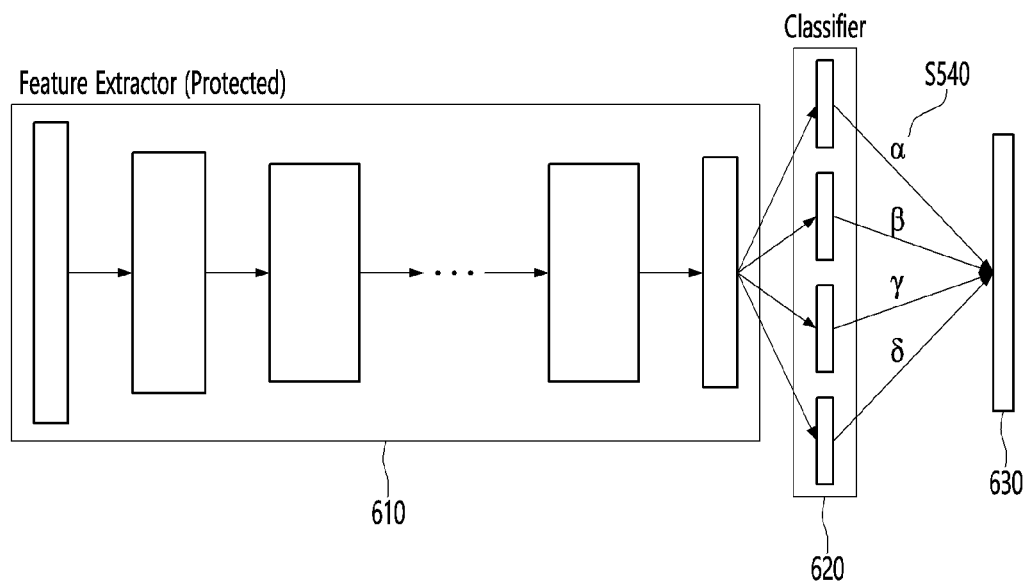
FIG. 6 is a view illustrating an artificial intelligence model according to an embodiment of the present disclosure.

FIG. 6 is a view illustrating an artificial intelligence model according to an embodiment of the present disclosure.

If a conventional artificial neural network is used, the input data obtained from the input interface 120 may change according to changes in the surrounding environment, and accordingly, classification reliability of the general artificial intelligence model may decrease.

Referring to FIG. 6, the artificial intelligence model 600 according to an embodiment of the present disclosure may include an artificial neural network model learned using transfer learning. Specifically, the artificial intelligence model 600 may include an artificial neural network to which the first learning model 610 and the second learning model 620 are connected.

In this case, the first learning model 610 may include a pre-training model. The pre-training model may include an artificial neural network that is learned by initial learning using a plurality of training data including input data and object information corresponding to the input data. Therefore, the weight of the first learning model 610 is not changed by additional transfer learning.

If the input data is input, the first learning model 610 may perform feature extraction of the input data and provide the extracted features to the second learning model 620.

In addition, the second learning model 620 may be connected to the first learning model 610 and output an object corresponding to input data as a result value.

The processor 180 may control the operation of the artificial intelligence apparatus 100 according to an object corresponding to a result value of the second learning model 620.

The result value may include a result of classifying the object and may include operation control information of the artificial intelligence apparatus 100.

According to an embodiment of the present disclosure, the second learning model 620 may include a plurality of output layers learned in environments which are different from each other. In this case, each of the plurality of output layers may include a plurality of output layers learned by transfer learning using a weight of the first learning model.

Specifically, each of the plurality of output layers learned by transfer learning using the weight of the first learning model may be connected with the first learning model 610.

For example, assuming that the second learning model 620 has a first output layer and a second output layer, the artificial intelligence model 600 may include a first artificial intelligence model to which the first learning model 610 and the first output layer are connected and a second artificial intelligence model to which the first learning model 610 and the second output layer are connected.

When input data is input to the artificial intelligence model 600, the first learning model 610 may perform feature extraction of the input data and provide the extracted features to the first output layer and the second output layer of the second learning model 620.

In addition, each of the first artificial intelligence model and the second artificial intelligence model may output a result value.

According to an embodiment of the present disclosure, each of the plurality of output layers included in the second learning model 620 may include a model learned using input data obtained from brightness information which is different from each other.

Specifically, the first artificial intelligence model to which the first learning model 610 and the first output layers of the second learning model 620 are connected may include input data obtained at first brightness and a model learned using correct answer information of the input data.

In addition, the second artificial intelligence model to which the first learning model 610 and the second output layers of the second learning model 620 are connected may include input data obtained at second brightness and a model learned using correct answer information of the input data.

At this time, the correct answer information of the input data may be the same in the first artificial intelligence model and the second artificial intelligence model. In addition, the first brightness and the second brightness may include image data obtained in brightness environments which are different from each other.

For example, the first brightness is a relatively dark light source of about 100 1x, and thus the input data obtained at the first brightness may have an average dark pixel value. In addition, the second brightness is a relatively bright light source of about 1000 1x, and thus the input data obtained at the second brightness may have an average bright pixel value.

As described above, since the first brightness and the second brightness are different from each other, the result values output by the first artificial intelligence model and the second artificial intelligence model may depend on the brightness result of the input data obtained from the input interface 120 of the artificial intelligence apparatus.

According to an embodiment of the present disclosure, the processor 180 may respectively assign weights corresponding to result values output by the plurality of output layers and combine the respective result values to which the weights are assigned to derive a final result. Hereinafter, a method for assigning weights will be described with reference to FIGS. 7 to 8.

FIG. 7 is a view illustrating an example of a weight according to an embodiment of the present disclosure.

According to an embodiment of the present disclosure, the processor 180 may assign a weight based on the brightness information obtained from the illuminance sensor of the sensing interface 140.

For example, a plurality of output layers included in the second learning model 620 may include first output layers learned using learning data obtained from first brightness information and second output layers learned using learning data obtained from second brightness information brighter than the first brightness information.

The processor 180 of the present disclosure may assign a first weight corresponding to a result value output by the first output layer, assign a second weight corresponding to a result value output by the second output layer to derive the final result, if the brightness information obtained by the sensing interface 140 is closer to the first brightness information than the second brightness information.

Specifically, a case where the brightness information obtained by the sensing interface 140 is closer to the first brightness information than the second brightness information may include a case where the magnitude of the difference between values of the brightness information obtained from the illuminance sensor and the first brightness information is less than the magnitude of the difference between values of the brightness information and the second brightness information. At this time, the first weight may have a larger value than the second weight.

Although the embodiment has been described using two artificial intelligence models, the present disclosure is not limited to this, and the processor 180 may assign weights to the respective result values output by a plurality of output layers corresponding to brightness information obtained from the illuminance sensor and derive the final result.

Referring to FIG. 7, according to an embodiment of the present disclosure, the processor 180 may assign a weight based on time information obtained from the GPS sensor of the sensing interface 140. Specifically, the processor 180 may derive a final result by assigning a weight corresponding to the time information to the respective result values output by the plurality of output layers.

For example, assuming that there are the first output layer learned in an environment (first brightness information, 200 1x to 500 1x) in which the second learning model is general, the second output layer learned in an environment (Day) which is relatively bright since the second output layer is affected by the light source more than the first brightness information, and a third output layer learned in an environment (Night) which is relatively dark since the third output layer is not affected by a light source than the first brightness information, the processor 180 may, depending on time, derive the final result of the artificial intelligence model 600 by adjusting the first weight assigned to the first output layer, the second weight assigned to the second output layer, and the third weight assigned to the third output layer.

In addition, according to an embodiment of the present disclosure, the processor 180 may adjust the weight assigned to the result value of each of the second output layer and the third output layer corresponding to a specific time, while the first weight of the first output layer learned in the general environment as illustrated in FIG. 7 is fixed.

For example, between 10:00 and 18:00, which is a time when natural light is strongly incident to the room, the third weight assigned to the result value of the third output layer learned in an environment (Night) which is darker than the first brightness information may be set lower than the second weight assigned to the result value of the second output layer learned at an environment (Day) which is brighter than the first brightness information.

In addition, between 20:00 and 06:00, which is a time when natural light is not incident to the room, the third weight may be set to be greater than the second weight.

In addition, the first output layer may be fixed to maintain the overall performance of the artificial intelligence model 600. The sum of the first weight, the second weight, and the third weight may be 1.

Figure 8:
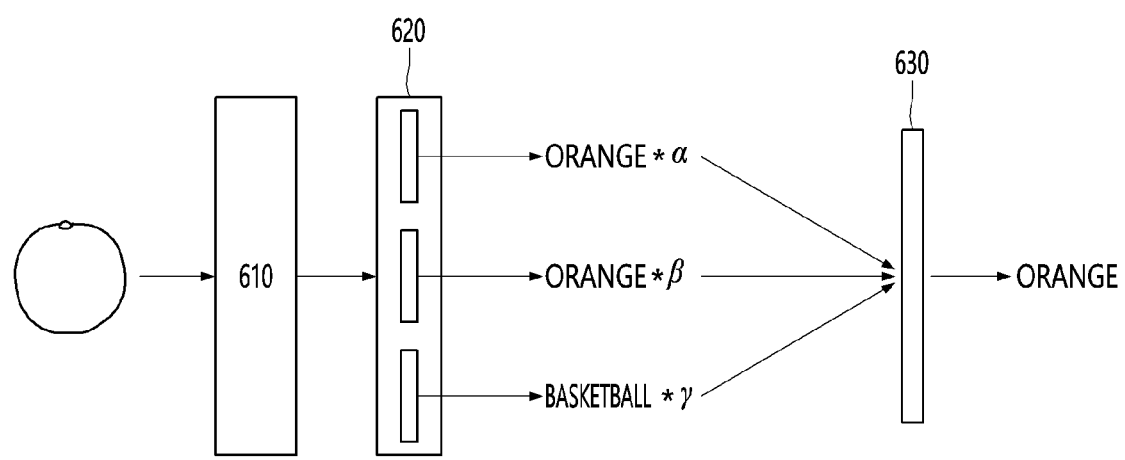
FIG. 8 is a view illustrating an artificial intelligence model according to an embodiment of the present disclosure.

FIG. 8 is a view illustrating an artificial intelligence model according to an embodiment of the present disclosure.

Referring to FIG. 8, a process in which a weight is assigned to each of a plurality of output layers included in the artificial intelligence model 600 according to an embodiment of the present disclosure and a final result is derived is illustrated.

As illustrated in FIG. 8, it is assumed that input data including an image of an orange (the fruit) is received through a camera in an environment (for example, 100 1× or less) in which input data is relatively dark.

The processor 180 may input the input data including the orange into the artificial intelligence model 600. The artificial intelligence model may include a first learning model 610 and a second learning model 620 connected with the first learning model 610. The input data including orange may be extracted as features from the first learning model 610 and the features extracted from the first learning model 610 may be provided to the second learning model 620.

The second learning model 620 includes a plurality of output layers, and as described in FIG. 7, each of the plurality of output layers may include the first output layer, the second output layer, and the third output layer learned from brightness information which is different from each other.

Meanwhile, the number of output layers of the present disclosure has been described as three, but this is only an example for describing the present disclosure and the present disclosure is not limited thereto.

According to an embodiment of the present disclosure, the first output layer is a model learned at a general first brightness and may output "orange" as a result value. In addition, the second output layer is a model learned in an environment darker than the first brightness and may also output "orange" as a result value. In addition, the third output layer is a model learned in an environment brighter than the first brightness and may output "basketball" as a result value.

The processor 180 may assign a weight to a result value of each of the plurality of output layers. For example, assuming that the time information obtained from the GPS of the sensing interface 140 is '7 am', the weight assigned to the first output layer is 0.1, and the weight assigned to the second output layer is 0.7, and the weight assigned to the third output layer may be 0.2.

The processor 180 may determine that the sum of the weights for "basketball" is 0.2 and the sum of the weights for "orange" is 0.8, and derive "orange" as the final result 630.

As illustrated in FIG. 8, if at least one of the respective result values of the plurality of output layers is different from each other since an accurate final result can be derived by assigning a different weight to each of the plurality of output layers, the effect of the present disclosure can be remarkable.

Figure 11:
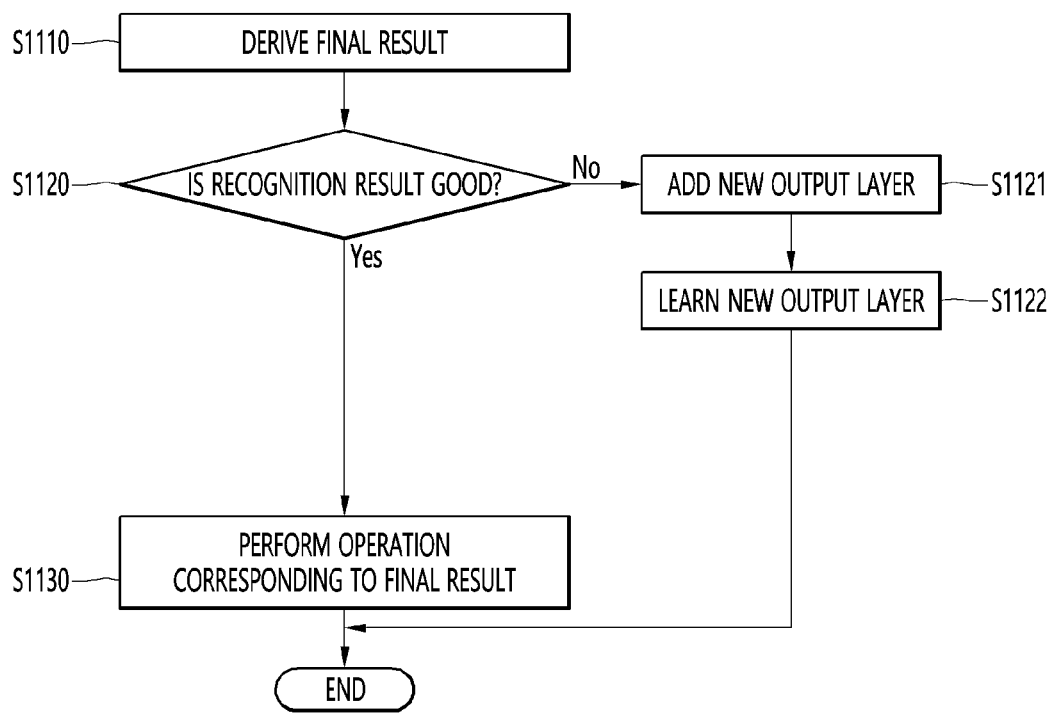
FIG. 11 is a flowchart according to an embodiment of the present disclosure.

In addition, if at least one of the respective result values of the plurality of output layers is different from each other, it can be a measure of whether the recognition result of the evaluation model of FIG. 11 is good.

Hereinafter, an update process of the artificial intelligence model 600 of the present disclosure will be described with reference to FIG. 9.

Figure 9:
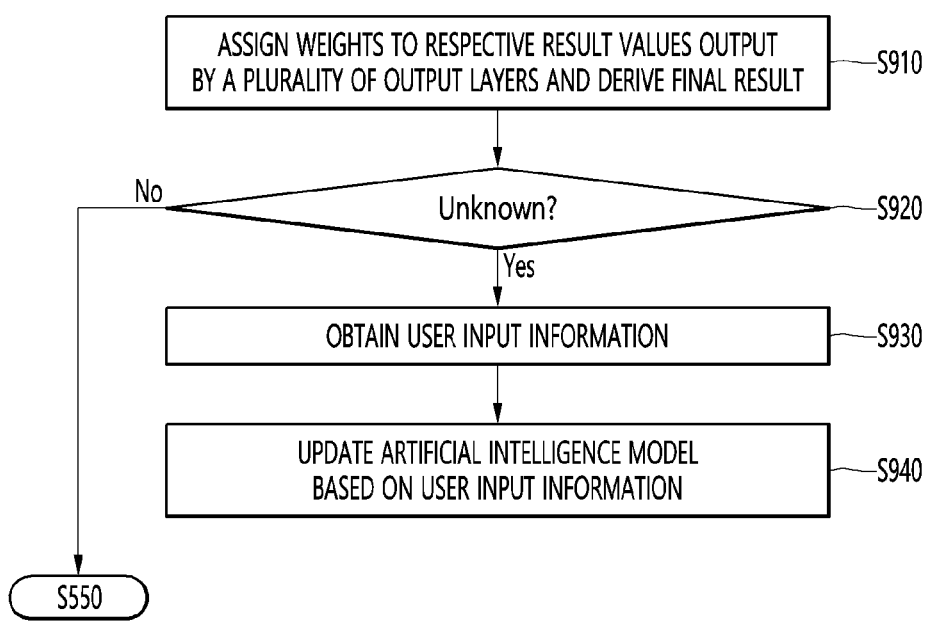
FIG. 9 is a flow chart according to an embodiment of the present disclosure.

FIG. 9 is a flow chart according to an embodiment of the present disclosure.

Referring to FIG. 9, the processor 180 may assign a weight to the respective result values output by a plurality of output layers and derive a final result (S910). At this time, if the final result is unknown (S920) rather than an object to be classified (S920), the processor 180 may receive the correct answer information about the relevant object from the user (S930) and train the artificial intelligence model 600 (S940).

Specifically, the artificial intelligence apparatus 100 of the present disclosure may further include an output interface 150 for outputting the final result and an input interface 120 for receiving correct answer information from a user. At this time, the input received from the user may be input from the input interface 120 of the artificial intelligence apparatus 100. In addition, the input received from the user may be received from an artificial intelligence server 200 and may be received using an application of a mobile terminal.

If the final result output by the output interface is unknown, the processor 180 may train each of the plurality of output layers using the correct answer information. If input data having similar features thereto through the learning is received, the artificial intelligence model 600 may derive an object corresponding to the input data as a final result.

Figure 10:
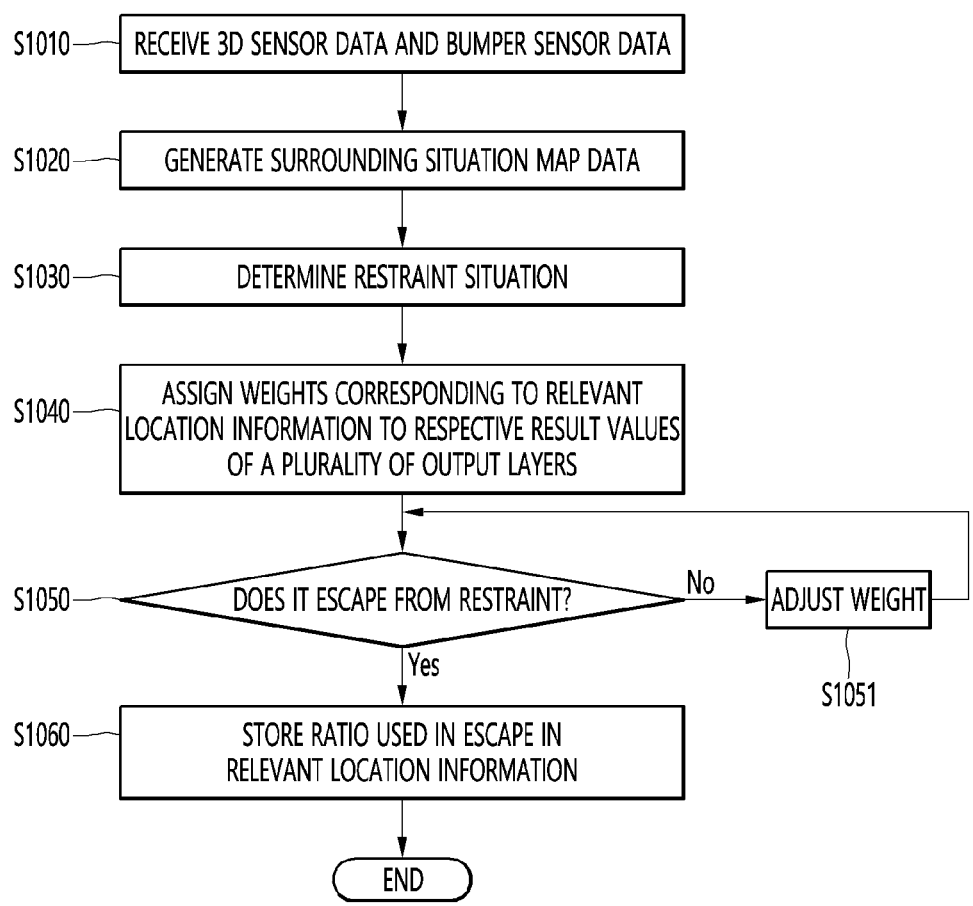
FIG. 10 is a flow chart according to an embodiment of the present disclosure.

FIG. 10 is a flow chart according to an embodiment of the present disclosure.

FIG. 10 is a flowchart illustrating a robot cleaner scenario according to an embodiment of the present disclosure. First, the sensing interface 140 of the present disclosure may further include a 3D sensor and a bumper sensor, and the processor 180 may generate surrounding situation map data using the information obtained from the sensing interface 140 (S1010,1020). At this time, the method for generating the surrounding situation map data may include generating contour of the surrounding environment and movement map data based on the bumper sensor data and 3D sensor data for the preset time.

According to an embodiment of the present disclosure, the processor 180 can determine that a restraint situation has occurred (S1030), input surrounding situation map data to the artificial intelligence model 600 when the restraint situation occurs, obtain the final route information, and control the operation of the robot cleaner. At this time, the method for determining that a restraint situation has occurred may include determining that the surrounding situation map data for the preset time corresponds to a restraint danger area if a bumper event occurs equal to or more than a preset number of times for the preset time.

In addition, the artificial intelligence model 600 may include an artificial neural network model that has been learned by transfer learning using surrounding situation map data and an escape route (final route).

Specifically, the processor 180 may connect the first learning model with the plurality of output layers, assign weights corresponding to the result values output by the plurality of output layers (S1040), and combine the respective result values to which weights are assigned to derive the final route information.

In addition, in the embodiment of the present disclosure, if the restraint risk continues for a preset time or more, the processor 180 may determine that it has not escaped from the restraint situation (S1050) and may reset a weight assigned to the respective result values output by the plurality of layers (S1051). The processor 180 may derive reset route information by combining the respective result values to which the reset weight is assigned.

Hereafter, if the processor 180 determines that the robot cleaner has escaped from the restraint situation, the processor 180 may store the weight ratio used for the escape in the corresponding location information (S1060).

In one embodiment of the present disclosure, through the on-device learning, the robot cleaner can determine a restraint situation and change a customized route in an individual usage environment according to weight adjustment according to the restraint situation.

Hereinafter, a method for generating a new output layer according to an embodiment of the present disclosure will be described with reference to FIG. 11.

FIG. 11 is a flowchart according to an embodiment of the present disclosure.

Referring to FIG. 11, if the artificial intelligence model 600 of the present disclosure derives the final result (S1110), the processor 180 may evaluate the performance of the final result output by the artificial intelligence model 600 (S1120).

At this time, a measure for evaluating the performance of the final result may include a case where at least one of the respective result values of the plurality of output layers included in the second learning model 620 has a different result value.

If all the respective result values of the plurality of output layers are the same, the processor 180 may perform an operation corresponding to the final result (S1130).

Also, if at least one of the respective result values of the plurality of output layers is different from each other, the processor 180 may determine that performance needs to be improved.

According to an embodiment of the present disclosure, if the performance improvement is required, the processor 180 may train an output layer that derives different result values of a plurality of existing output layers.

In addition, according to an embodiment of the present disclosure, if the performance improvement is required, the processor 180 may generate a new output layer in the second learning model 620 (S1121). At this time, the new output layer may be learned by transfer learning using input data input to the artificial intelligence model and the final result (S1122).

Thereafter, even if the same input data is input, the artificial intelligence model 600 may derive an accurate final result using the result value output from the new output layer and the result value output from a plurality of updated output layers.

In one embodiment of the present disclosure, the final result may include a case where the artificial intelligence apparatus classifies the object if the operation of the artificial intelligence apparatus is controlled.

The present disclosure can improve the versatility of an artificial intelligence apparatus by preventing the overfitting of a specific environment by using a plurality of output layers.

In addition, the present disclosure may improve classification accuracy by lowering a weight ratio assigned to an existing output layer and increasing a weight ratio assigned to a newly learned output layer, if increasing the hit ratio of a specific environment.

In addition, the present disclosure can improve the reliability of classification results even in a new environment by adding a new output layer if the result values of the plurality of output layers are different from each other. Flowcharts according to the present disclosure may be performed regardless of the order or concurrently. That is, they are not constrained in time-series order.

Other Implementations are within the Scope of the Following Claims

The present disclosure can be made in software, firmware or a combination of software and firmware.

The present disclosure may include one or more processors. The one or more processors may include 'the processor 180' or 'a processor for operating an artificial intelligence model'.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus comprising:
an input interface configured to obtain input data;
a sensing interface comprising an illuminance sensor configured to obtain environment information comprising brightness information and time information; and
one or more processors configured to:
classify an object in the input data by inputting the input data to an artificial intelligence model,
wherein the artificial intelligence model includes a first learning model and a second learning model connected to the first learning model,
wherein the first learning model includes a pre-trained model,
wherein the second learning model includes a plurality of output layers connected to the first learning model,
wherein the one or more processors are further configured to:
assign respective weights for result values output by the plurality of output layers based on the time information, and
combine each of the result values to which the weights are assigned to derive a final result of the artificial intelligence model,
wherein each of the plurality of output layers includes a model trained using training data having different brightness levels,
wherein the plurality of output layers include:
a first output layer trained using training data obtained at a first brightness,
a second output layer trained using training data obtained at a second brightness brighter than the first brightness, and
a third output layer trained using training data obtained at a third brightness darker than the first brightness, and
wherein the one or more processors are further configured to derive the final result based on:
a first weight assigned to a result value output by the first output layer based on the time information corresponding to a specific time;
a second weight assigned to a result value output by the second output layer; and
a third weight assigned to a result value output by the third output layer.

2. The artificial intelligence apparatus of claim 1, wherein the model of each of the plurality of output layers is trained by transfer learning using trained weights of the first learning model.

3. The artificial intelligence apparatus of claim 1, wherein the first weight is a fixed value, wherein the second weight and the third weight are adjusted corresponding to the specific time, and wherein the sum of the first weight, the second weight, and the third weight is 1.

4. The artificial intelligence apparatus of claim 2, wherein at least one of the result values of the plurality of output layers is different from other result values.

5. The artificial intelligence apparatus of claim 4, wherein the one or more processors are configured to generate a new output layer when at least one of the result values of the plurality of output layers is different from other result values, and
wherein the new output layer is trained by transfer learning using the input data and the final result.

6. The artificial intelligence apparatus of claim 2, further comprising:
   an output interface configured to output the final result; and
   a user input interface configured to receive correct answer information from a user,
   wherein the one or more processors are further configured to update each of the plurality of output layers using the correct answer information when the final result output by the output interface is unknown.

7. A method for operating an artificial intelligence apparatus, the method comprising:
   obtaining input data,
   obtaining environment information comprising brightness information and time information; and
   classifying an object in the input data by inputting the input data to an artificial intelligence model,
   wherein the artificial intelligence model includes a first learning model and a second learning model connected to the first learning model,
   wherein the first learning model includes a pre-trained model,
   wherein the second learning model includes a plurality of output layers connected to the first learning model,
   assigning respective weights for result values output by the plurality of output layers based on the time information, and
   combining each of the result values to which the weights are assigned to derive a final result of the artificial intelligence model,
   wherein each of the plurality of output layers includes a model trained using training data having different brightness levels,
   wherein the one or more processors are further configured to assign weights for the result values output by the plurality of output layers based on the time information,
   wherein the plurality of output layers include:
      a first output layer trained using training data obtained at a first brightness,
      a second output layer trained using training data obtained at a second brightness brighter than the first brightness, and
      a third output layer trained using training data obtained at a third brightness darker than the first brightness, and
   wherein the one or more processors are further configured to derive the final result based on:
      a first weight assigned to a result value output by the first output layer based on the time information corresponding to a specific time;
      a second weight assigned to a result value output by the second output layer; and
      a third weight assigned to a result value output by the third output layer.

8. The method of claim 7,
   wherein the method further comprises assigning a higher weight to a result value of the first output layer or the second output layer based on whether the brightness information is closer to the first brightness or the second brightness.

9. The method of claim 7, further comprising:
   generating a new output layer based on at least one of the result values of the plurality of output layers being different from other result values,
   wherein the new output layer is trained by transfer learning using the input data and the final result.

10. The method of claim 7, further comprising:
   outputting the final result;
   receiving correct answer information from a user; and
   updating each of the plurality of output layers using the correct answer information when the final result is unknown.

* * * * *